US012269553B2

(12) United States Patent
Matsubara

(10) Patent No.: US 12,269,553 B2
(45) Date of Patent: Apr. 8, 2025

(54) CONTROL DEVICE, SUSPENSION SYSTEM, AND SADDLE-TYPE VEHICLE

(71) Applicants: Hitachi Astemo, Ltd., Hitachinaka (JP); HONDA MOTOR CO., LTD., Tokyo (JP)

(72) Inventor: Kentaro Matsubara, Hitachinaka (JP)

(73) Assignees: Hitachi Astemo, Ltd., Hitachinaka (JP); HONDA MOTOR CO., LTD., Tokyo (JP)

( * ) Notice: Subject to any disclaimer, the term of this patent is extended or adjusted under 35 U.S.C. 154(b) by 461 days.

(21) Appl. No.: 17/698,692

(22) Filed: Mar. 18, 2022

(65) Prior Publication Data

US 2022/0204111 A1 Jun. 30, 2022

Related U.S. Application Data

(63) Continuation of application No. PCT/JP2020/011691, filed on Mar. 17, 2020.

(51) Int. Cl.
*B62J 45/20* (2020.01)
*B62J 45/412* (2020.01)
(Continued)

(52) U.S. Cl.
CPC .............. *B62J 45/20* (2020.02); *B62J 45/412* (2020.02); *B62K 25/20* (2013.01); *B62J 45/415* (2020.02)

(58) Field of Classification Search
CPC ........ B62J 45/20; B62J 45/412; B62J 45/415; B62K 25/20; B62K 25/04;
(Continued)

(56) References Cited

U.S. PATENT DOCUMENTS

| 2014/0005889 A1* | 1/2014 | Hayakawa ....... B60G 17/01933 701/37 |
| 2020/0062070 A1 | 2/2020 | Fukazawa et al. |
| 2021/0245569 A1 | 8/2021 | Suzuki et al. |

FOREIGN PATENT DOCUMENTS

| DE | 102014209164 A1 * | 11/2015 | ........... B60G 17/019 |
| JP | 2019014341 A | 1/2019 | |
| JP | 6495566 B1 | 4/2019 | |

OTHER PUBLICATIONS

Y. Hayakawa, R. White, T. Kimura and G. Naito, "Driver-compatible steering system for wide speed-range path following," in IEEE/ASME Transactions on Mechatronics, vol. 9, No. 3, pp. 544-552, Sep. 2004, doi: 10.1109/TMECH.2004.834653. (Year: 2004).*

(Continued)

*Primary Examiner* — Jess Whittington
*Assistant Examiner* — Shahira Baajour
(74) *Attorney, Agent, or Firm* — Leason Ellis LLP; Edward J. Ellis; Melvin C. Garner

(57) ABSTRACT

A control device includes a reference unit, a correction unit, and a target setting unit. The correction unit sets a reference correction current serving as a reference in determining the correction current to 0 in an extremely low velocity range of a change velocity of a stroke amount, sets the reference correction current to a predetermined steady-state value in a medium and high velocity range of the change velocity, and sets the reference correction current to a value equal to or larger than 0 and equal to or smaller than the steady-state value in a low velocity range of the change velocity.

3 Claims, 12 Drawing Sheets

(51) Int. Cl.
*B62J 45/415* (2020.01)
*B62K 25/20* (2006.01)

(58) Field of Classification Search
CPC ............ B62K 2025/044; B60G 17/015; B60G 17/016; B60G 17/056
See application file for complete search history.

(56) References Cited

OTHER PUBLICATIONS

English Translation of Bender (DE102014209164A1) (Year: 2024).*
International Search Report mailed Jun. 9, 2020 for the corresponding International Patent Application No. PCT/JP2020/011691, 5 pages [English translation attached].

* cited by examiner

CONTROL DEVICE, SUSPENSION SYSTEM, AND SADDLE-TYPE VEHICLE

CROSS-REFERENCE TO RELATED APPLICATION(S)

This application is a Continuation of International Application No. PCT/JP2020/011691 filed on Mar. 17, 2020, the content of which is incorporated herein by reference in its entirety.

FIELD OF THE INVENTION

The present invention relates to a control device, a suspension system, and a saddle-type vehicle.

BACKGROUND OF THE INVENTION

The present applicant proposes a control device capable of preventing deterioration in ride quality and the like. For example, Japanese Patent No. 6495566 proposes a control device which controls a damping force of a damping device, which damps a force generated between a vehicle body of a two-wheeled vehicle and at least one of a front wheel and a rear wheel, by using an angular velocity of rotational movement in a front-rear direction under a spring of the two-wheeled vehicle, which is generated due to a difference between a velocity in an upper-lower direction of the front wheel and a velocity in the upper-lower direction of the rear wheel.

In the control device of Japanese Patent No. 6495566, a setting unit which sets a target current supplied to a solenoid of a damping force control valve of the damping device includes a reference unit which sets a reference current, and a correction unit which sets a correction current for correcting the reference current in accordance with a traveling state of the two-wheeled vehicle. Then, the correction unit calculates the correction current by multiplying a reference correction current serving as a reference in setting the correction current and a synthesis coefficient including a lower coefficient set using the angular velocity of the rotational movement in the front-rear direction under the spring. In the above configuration, the correction unit sets the reference correction current to 0 when a change velocity of a stroke amount of a suspension is 0, sets the reference correction current to a predetermined positive value when the velocity is larger than 0, and sets the reference correction current to a predetermined negative value when the velocity is smaller than 0.

For example, as in Japanese Patent No. 6495566, in control in the related art, from the viewpoint of making it easy to obtain an effect of skyhook control, it is conceivable to set the reference correction current to a predetermined positive value or negative value depending on whether the velocity is larger or smaller than 0 even in an extremely low velocity range where the change velocity of the stroke amount of the suspension is extremely small. In such skyhook control, for example, when a timing at which a sensor which detects the stroke amount detects the stroke amount and a timing at which the control device sets the reference correction current using the detected stroke amount deviate from each other, there is a concern that a steering feeling may become uncomfortable and ride quality may deteriorate. For example, when the suspension starts to contract from an extended state, the velocity is normally smaller than 0 and the reference correction current should be set to a negative value, and a damping force should decreased, but due to a timing deviation above, the reference correction current is set to a positive value based on detection that the velocity is larger than 0, and there is a concern that control may be performed to increase the damping force. When such control is performed, the ride quality tends to deteriorate. Thus, in the skyhook control in the related art, there is room for further improvement in terms of improving the ride quality.

SUMMARY OF THE INVENTION

An object of the present invention is to provide a control device and the like capable of improving ride quality over a wide velocity range.

Hereinafter, the present disclosure will be described.

According to one aspect of the present disclosure, there is provided a control device including: a reference unit configured to set a reference current serving as a reference in determining a target current supplied to a damping force control valve included in a suspension disposed between a vehicle body of a saddle-type vehicle and at least one of a front wheel disposed on a front side of the vehicle body and a rear wheel disposed on a rear side of the vehicle body; a correction unit configured to set a correction current to correct the reference current; and a target setting unit configured to set the target current by adding the reference current and the correction current, in which the correction unit sets a reference correction current serving as a reference in determining the correction current to 0 in an extremely low velocity range including a case where a change velocity of a stroke amount of the suspension is 0, sets the reference correction current to a predetermined steady-state value in a medium and high velocity range of the change velocity which is a velocity range in which an absolute value of the change velocity is larger than an absolute value of the change velocity in the extremely low velocity range, and sets the reference correction current to a value equal to or larger than 0 and equal to or smaller than the steady-state value in a low velocity range of the change velocity which is a velocity range between the extremely low velocity range and the medium and high velocity range.

According to another aspect of the present disclosure, there is provided a control device including: a reference unit configured to set a reference current serving as a reference in determining a target current supplied to a damping force control valve included in a suspension disposed between a vehicle body of a saddle-type vehicle and at least one of a front wheel disposed on a front side of the vehicle body and a rear wheel disposed on a rear side of the vehicle body; a correction unit configured to set a correction current to correct the reference current; and a target setting unit configured to set the target current by adding the reference current and the correction current, in which the correction unit sets a reference correction current serving as a reference in determining the correction current to 0 when a change velocity of a stroke amount of the suspension is 0, and sets the reference correction current to 0 in a first extremely low velocity range which is a velocity range in which the change velocity is adjacent to 0 in a region where the change velocity is smaller than 0, or sets the reference correction current to 0 in a second extremely low velocity range which is a velocity range in which the change velocity is adjacent to 0 in a region where the change velocity is larger than 0, when the correction unit sets the reference correction current to 0 in the first extremely low velocity range, the correction unit sets the reference correction current to a predetermined first steady-state value in a first medium and high velocity range which is a velocity range on a side where an absolute value of the change velocity is larger than an absolute value of the change velocity in the first extremely low velocity range in a region where the change velocity is smaller than 0, sets the reference correction current to a value which changes from 0 to the first steady-state value in accordance with a decrease in the change velocity in a first low velocity range which is a velocity range between the first extremely low velocity range and the first medium and high velocity range, sets the reference correction current to a predetermined second steady-state value in a second medium and high velocity range which is a velocity range on a side where an absolute value of the change velocity is larger than an absolute value of the change velocity in the second extremely low velocity range in a region where the change velocity is larger than 0, and sets the reference correction current to a value which changes from 0 to the second steady-state value in accordance with an increase in the change velocity in a second low velocity range which is a velocity range between the second extremely low velocity range and the second medium and high velocity range, and when the correction unit sets the reference correction current to 0 in the second extremely low velocity range, the correction unit sets the reference correction current to the predetermined first steady-state value in the first medium and high velocity range, sets the reference correction current to a value which changes from 0 to the first steady-state value in accordance with the decrease in the change velocity in the first extremely low velocity range and the first low velocity range, sets the reference correction current to the predetermined second steady-state value in the second medium and high velocity range, and sets the reference correction current to a value which changes from 0 to the second steady-state value in accordance with the increase in the change velocity in the second low velocity range.

According to another aspect of the present disclosure, there is provided a control device including: a reference unit configured to set a reference current serving as a reference in determining a target current supplied to a damping force control valve included in a suspension disposed between a vehicle body of a saddle-type vehicle and at least one of a front wheel disposed on a front side of the vehicle body and a rear wheel disposed on a rear side of the vehicle body; a correction unit configured to set a correction current to correct the reference current; and a target setting unit configured to set the target current by adding the reference current and the correction current, in which the correction unit sets a reference correction current serving as a reference in determining the correction current to 0 when a change velocity of a stroke amount of the suspension is 0, sets the reference correction current to a predetermined steady-state value in a medium and high velocity range which is a velocity range on a side where an absolute value of the change velocity is larger than an absolute value of the change velocity in an extremely low velocity range which is a velocity range in which the change velocity is adjacent to 0, and sets the reference correction current to a value which changes from 0 to the steady-state value in accordance with an increase in an absolute value of the change velocity in the extremely low velocity and a low velocity range which is a velocity range between the extremely low velocity range and the medium and high velocity range.

According to another aspect of the present disclosure, there is provided a suspension system including: the control device according to the above mode; and a suspension whose damping force is controlled by the control device.

According to another aspect of the present disclosure, there is provided a saddle-type vehicle including: a vehicle body; a front wheel disposed on a front side of the vehicle body and a rear wheel disposed on a rear side of the vehicle body; and the suspension system according to the above mode.

Advantageous Effects of Invention

According to the present invention, it is possible to provide a control device or the like capable of improving ride quality over a wide velocity range.

DETAILED DESCRIPTION OF THE INVENTION

Hereinafter, examples of embodiments of the present invention will be described in detail with reference to the accompanying drawings. The following embodiments are examples of the embodiments of the present invention, and the present invention is not limited to the following embodiments. The present invention can be applied to a vehicle having two front wheels and one rear wheel, or one front wheel and two rear wheels, in addition to a motorcycle. In the present invention, a saddle-type vehicle is a concept including the above vehicle and the motorcycle.

In the following description, members and portions having the same shape and function are denoted by the same reference signs in a motorcycle 1 and a motorcycle disclosed in Japanese Patent No. 6495566, and a detailed description thereof is omitted.

First Embodiment

Figure 1:
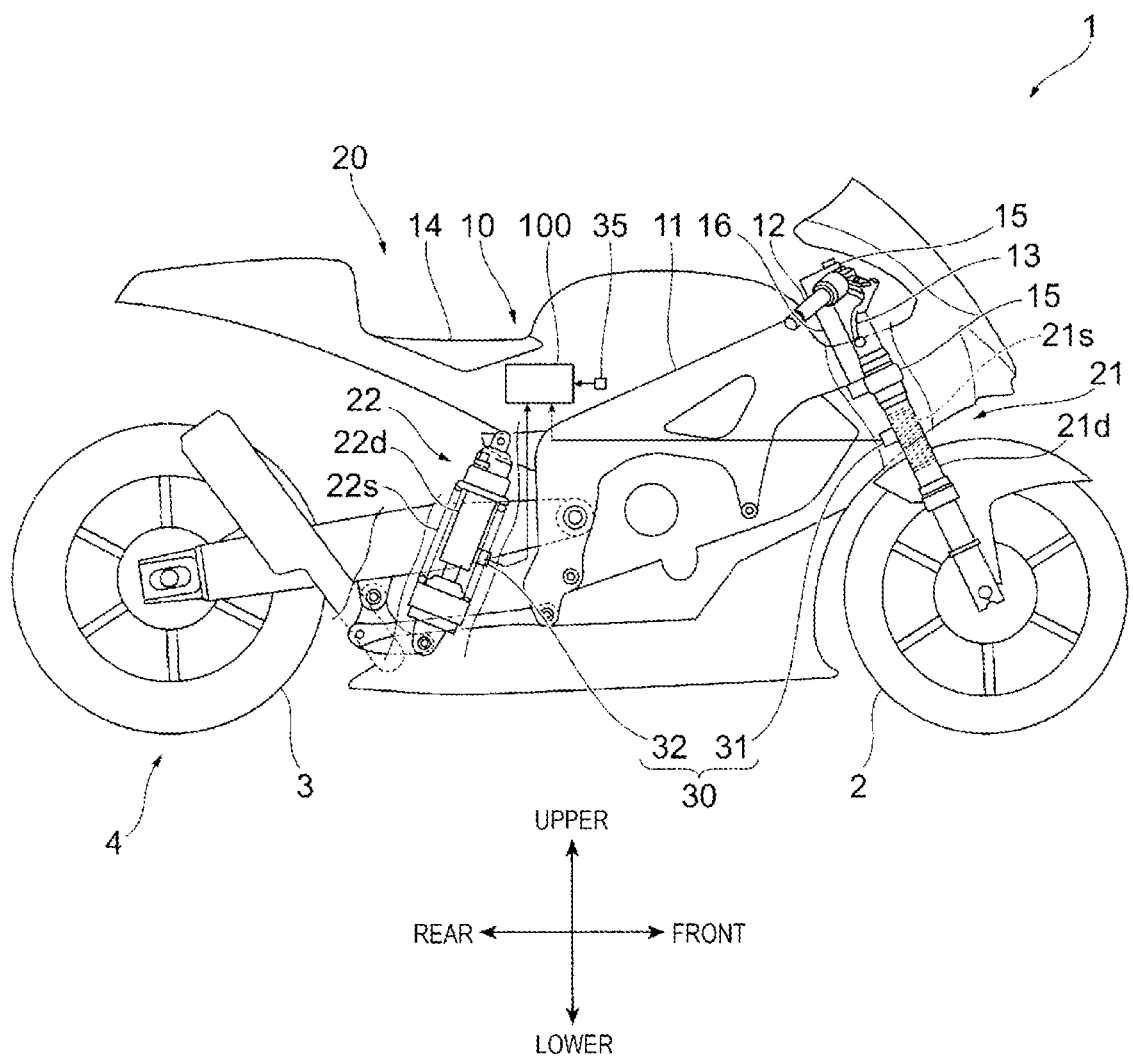
FIG. 1 is a diagram illustrating an example of a schematic configuration of a motorcycle 1 according to a first embodiment.

FIG. 1 is a diagram illustrating an example of a schematic configuration of the motorcycle 1 according to the first embodiment.

Figure 2:
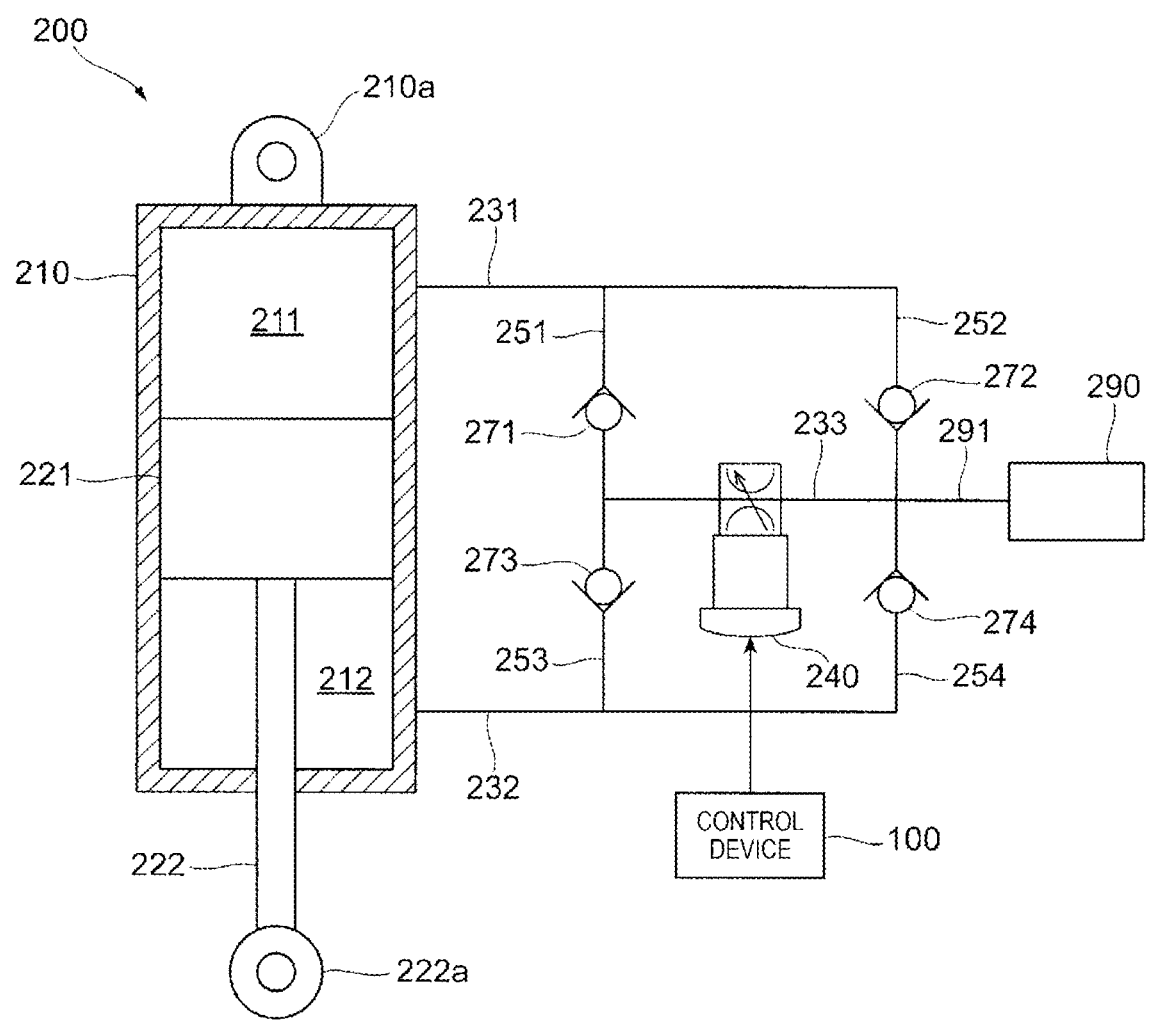
FIG. 2 is a diagram illustrating an example of a schematic configuration of a damping device 200.

FIG. 2 is a diagram illustrating an example of a schematic configuration of a damping device 200.

Figure 3:
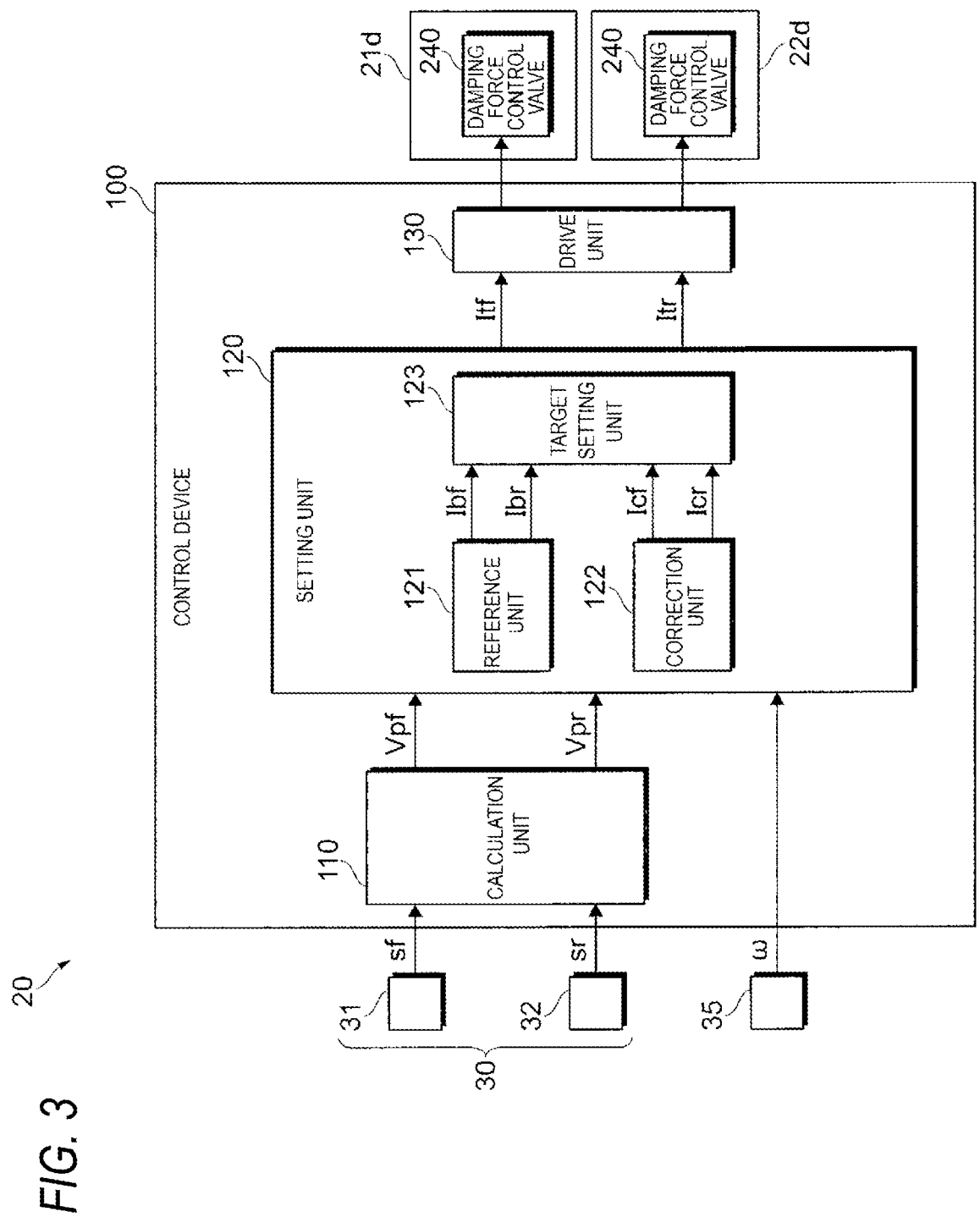
FIG. 3 is a diagram illustrating an example of a schematic configuration of a control device 100.

FIG. 3 is a diagram illustrating an example of a schematic configuration of a control device 100.

The motorcycle 1 as an example of the saddle-type vehicle includes a front wheel 2, a rear wheel 3, and a vehicle body 10. The vehicle body 10 includes a vehicle body frame 11, a handle 12, a brake lever 13, and a seat 14.

The motorcycle 1 includes a suspension 21 on a front wheel side, two brackets 15 holding two suspensions 21, and a shaft 16 disposed between the two brackets 15. The suspension 21 includes a suspension spring 21s which absorbs an impact applied to the front wheel 2 from a road surface or the like, and a damping device 21d which damps vibration of the suspension spring 21s.

The motorcycle 1 further includes a suspension 22 on a rear wheel side. The suspension 22 includes a suspension spring 22s which absorbs an impact applied to the rear wheel 3 from the road surface or the like, and a damping device 22d which damps vibration of the suspension spring 22s.

In the following description, the front wheel 2 and the rear wheel 3 may be collectively referred to as a "wheel". The suspension 21 on the front wheel side and the suspension 22 on the rear wheel side may be collectively referred to as a "suspension". The suspension spring 21s and the suspension spring 22s may be collectively referred to as a "spring". The damping device 21d and the damping device 22d may be collectively referred to as the "damping device 200". An assembly of components below the spring is referred to as an under-spring part 4. The under-spring part 4 includes the front wheel 2 and the rear wheel 3.

The motorcycle 1 includes a stroke sensor 31, a stroke sensor 32, and a pitch rate sensor 35 which detects a pitch rate which is an angular velocity around a pitch axis passing through a center of gravity G of the vehicle body 10. In the following description, the stroke sensor 31 and the stroke sensor 32 may be collectively referred to as a "stroke sensor 30".

The motorcycle 1 includes the control device 100 which uses detection values of the stroke sensor 30 and the pitch rate sensor 35 to control damping forces of the damping device 21d and the damping device 22d.

A suspension system 20 according to the present invention is a system including the suspension (suspension 21 and suspension 22) and the control device 100.

(Damping Device 200)

The damping device 200 includes a cylinder 210, a piston 221, and a piston rod 222. An end portion 210a on one side (upper side in FIG. 2) of the cylinder 210 is connected to the vehicle body 10. An end portion on one side of the piston rod 222 is held by the piston 221, and an end portion 222a on the other side (lower side in FIG. 2) of the piston rod 222 is connected to the wheel.

An inside of the cylinder 210 is divided into an oil chamber 211 on a compression side and an oil chamber 212 on an extension side.

The damping device 200 includes a first oil passage 231, a second oil passage 232, a third oil passage 233, and a damping force control valve 240. The damping device 200 includes a first branch path 251, a second branch path 252, a third branch path 253, and a fourth branch path 254.

The damping device 200 includes a first check valve 271, a second check valve 272, a third check valve 273, and a fourth check valve 274. The damping device 200 includes a reservoir 290 and a reservoir passage 291.

The damping force control valve 240 has a solenoid, and increases a pressure of hydraulic oil passing through the valve as a current amount supplied to the solenoid increases. The current amount energized in the solenoid is controlled by the control device 100.

(Control Device 100)

The control device 100 is an arithmetic and logical operation circuit including a CPU, a ROM, a RAM, a backup RAM, or the like.

A stroke signal sf on the front wheel side obtained by converting a stroke amount of the suspension 21 detected by the stroke sensor 31 into an output signal is input to the control device 100. A stroke signal sr on the rear wheel side obtained by converting a stroke amount of the suspension 22 detected by the stroke sensor 32 into an output signal is input to the control device 100. In addition, a rate signal ω corresponding to the pitch rate from the pitch rate sensor 35 is also input to the control device 100.

The control device 100 controls the current amount supplied to the solenoid of the damping force control valve 240 to control the damping force. Specifically, when the damping force is increased, the control device 100 increases the current amount supplied to the solenoid of the damping force control valve 240, and when the damping force is decreased, the control device 100 reduces the current amount supplied to the solenoid of the damping force control valve 240.

The control device 100 includes a calculation unit 110 which uses the stroke signals sf and sr from the stroke sensor 30 to calculate velocities Vpf and Vpr, which are change velocities of the stroke amount. The control device 100 includes a setting unit 120 which sets target currents Itf and Itr supplied to the solenoid of the damping force control valve 240, and a drive unit 130 which drives the damping force control valve 240.

The calculation unit 110 calculates an amount of change in the stroke amount of the suspension 21 per unit time, thereby calculating the velocity Vpf on the front wheel side. In addition, the calculation unit 110 calculates an amount of change in the stroke amount of the suspension 22 per unit time, thereby calculating the velocity Vpr on the rear wheel side. The velocity Vpf and the velocity Vpr may be collectively referred to as a "velocity Vp". The velocity Vp is a change velocity of the stroke amount of the suspension. In the following description, a reference sign of the velocity Vp in an extension direction of the suspension is set to be positive, and a reference sign of the velocity Vp in a compression direction of the suspension is set to be negative.

(Setting Unit 120)

The setting unit 120 sets the target current Itf on the front wheel side supplied to the solenoid of the damping force control valve 240 of the damping device 21d based on the velocity Vpf or the like calculated by the calculation unit 110. The setting unit 120 sets the target current Itr on the rear wheel side supplied to the solenoid of the damping force control valve 240 of the damping device 22d based on the velocity Vpr calculated by the calculation unit 110. Hereinafter, the target current Itf and the target current Itr may be collectively referred to as a "target current It".

The setting unit 120 includes a reference unit 121 which sets reference currents Ibf and Ibr serving as references in setting the target currents Itf and Itr. The setting unit 120 includes a correction unit 122 which sets correction currents Icf and Icr for correcting the reference currents Ibf and Ibr in accordance with a traveling state of the motorcycle 1. Hereinafter, the correction current Icf and the correction current Icr may be collectively referred to as a "correction current Ic".

In addition, the setting unit 120 includes a target setting unit 123 which finally sets the target currents Itf and Itr by adding the reference currents Ibf and Ibr set by the reference unit 121 and the correction currents Icf and Icr set by the correction unit 122.

Figure 4:
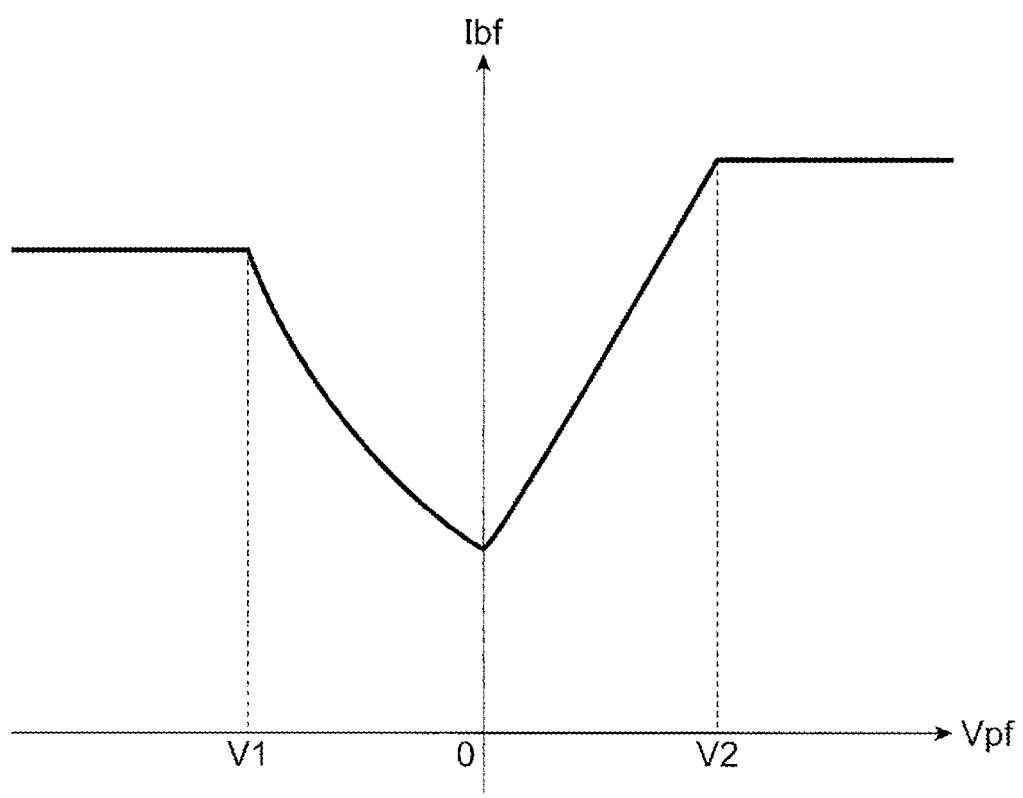
FIG. 4 is a schematic diagram of a control map illustrating an example of a relationship between a reference current Ibf and a velocity Vpf.

FIG. 4 is a schematic diagram of a control map illustrating an example of a relationship between the reference current Ibf and the velocity Vpf.

The reference unit 121 calculates the reference current Ibf according to the velocity Vpf. For example, the reference unit 121 calculates the reference current Ibf by assigning the velocity Vpf into the control map illustrated in FIG. 4 which shows the relationship between the reference current Ibf and the velocity Vpf, which is created in advance based on an empirical rule and recorded in the ROM.

In the control map illustrated in FIG. 4, in a case where the velocity Vpf is negative, when the velocity Vpf is equal to or larger than a first predetermined velocity V1, the smaller the velocity Vpf is, the larger the current amount is, and when the velocity Vpf is smaller than the first predetermined velocity V1, the current amount is set to be constant. In a case where the velocity Vpf is positive, when the velocity Vpf is equal to or smaller than a second predetermined velocity V2, the larger the velocity Vpf is, the larger the current amount is, and when the velocity Vpf is larger than the second predetermined velocity V2, the current amount is set to be constant.

Since a method of calculating the reference current Ibr by the reference unit 121 is the same as a method of calculating the reference current Ibf, a detailed description thereof is omitted. In addition, since a control map illustrating an example of a relationship between the reference current Ibr and the velocity Vpr is similar as the control map illustrating an example of the relationship between the reference current Ibf and the velocity Vpf, a detailed description thereof is omitted. However, specific values of the first predetermined velocity V1, the second predetermined velocity V2, and a constant current amount may be the same or different.

Figure 5:
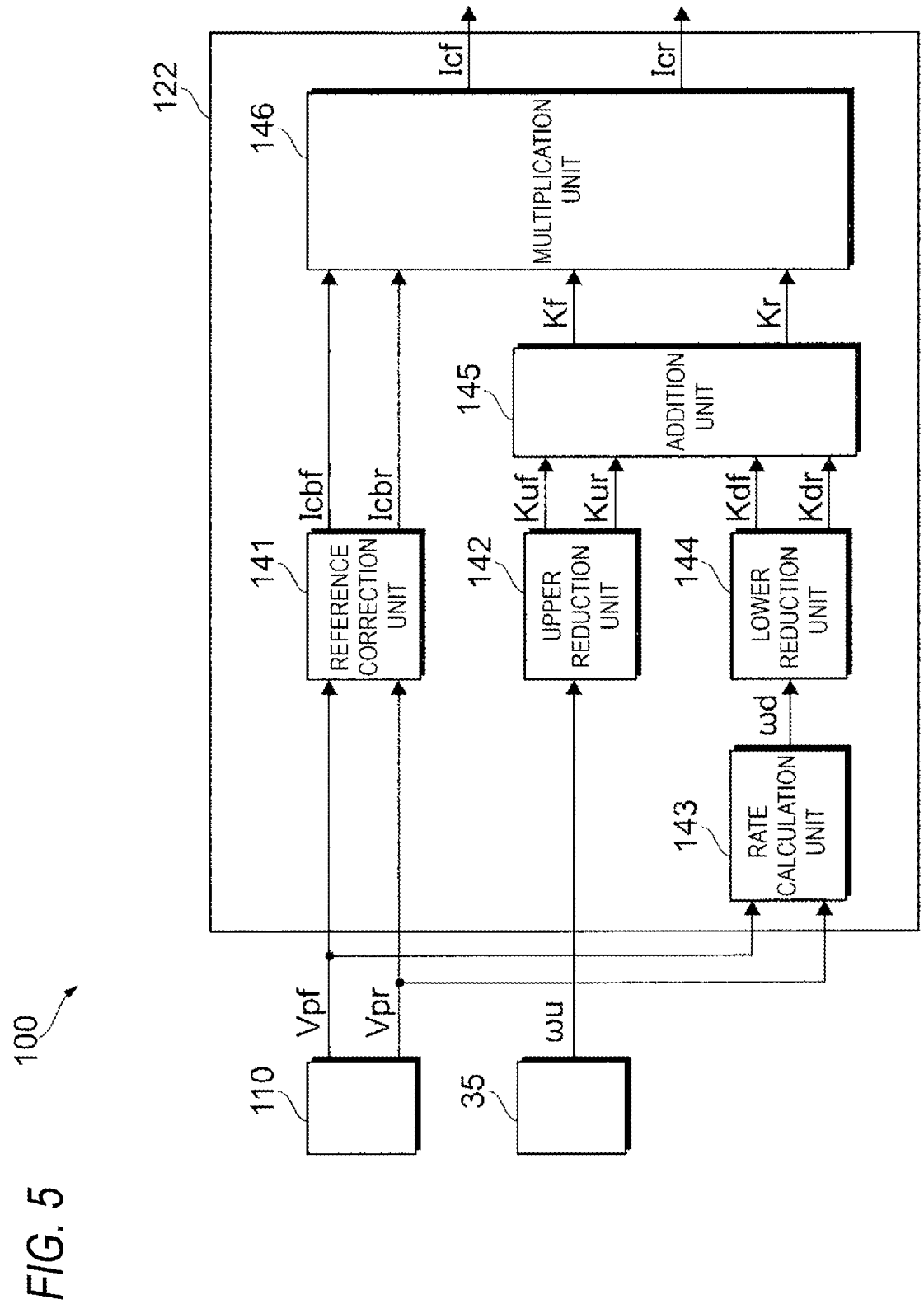
FIG. 5 is a diagram illustrating an example of a schematic configuration of a correction unit 122.

FIG. 5 is a diagram illustrating an example of a schematic configuration of the correction unit 122.

Figure 6:
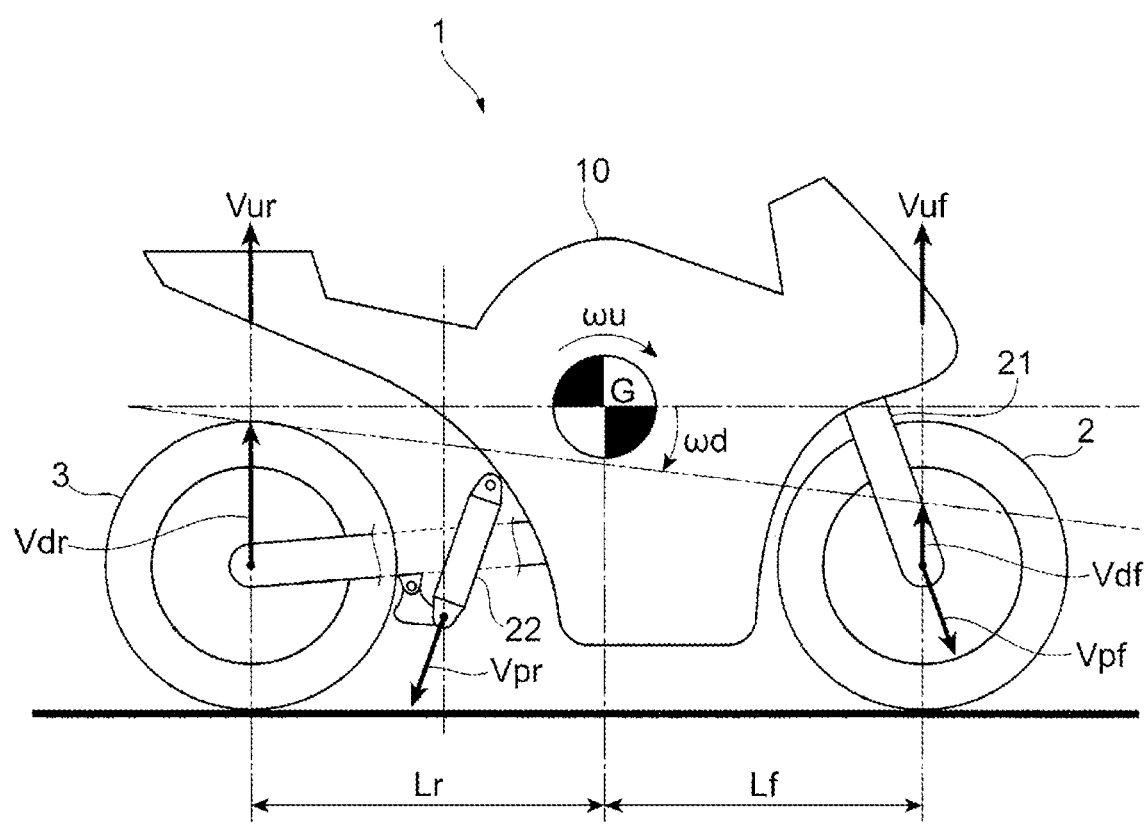
FIG. 6 is a schematic diagram illustrating vertical velocities Vuf and Vur, velocities Vpf and Vpr, vertical velocities Vdf and Vdr, an upper rate ωu, and a lower rate ωd.

FIG. 6 is a schematic diagram illustrating vertical velocities Vuf and Vur, the velocities Vpf and Vpr, vertical velocities Vdf and Vdr, an upper rate ωu, and a lower rate ωd.

The correction unit 122 includes a reference correction unit 141 which sets a reference correction current Icbf serving as a reference in setting the correction current Icf and a reference correction current Icbr serving as a reference in setting the correction current Icr. Hereinafter, the reference correction current Icbf and the reference correction current Icbr may be collectively referred to as a "reference correction current Icb".

The correction unit 122 includes an upper reduction unit 142 which reduces rotational movement of the vehicle body 10 in a front-rear direction, which is caused by a difference between the vertical velocity Vuf which is a velocity in an upper-lower direction generated in the vehicle body 10 on a front wheel 2 side and a vertical velocity Vur which is a velocity in the upper-lower direction generated in the vehicle body 10 on a rear wheel 3 side. The upper reduction unit 142 sets an upper coefficient Kuf for correcting the reference correction current Icbf and an upper coefficient Kur for correcting the reference correction current Icbr. A pitch rate of the rotational movement of the vehicle body 10 in the front-rear direction caused by the difference between the vertical velocity Vuf and the vertical velocity Vur is referred to as the "upper rate ωu". The upper rate ωu is detected by the pitch rate sensor 35.

In addition, the correction unit 122 includes a rate calculation unit 143 which calculates the lower rate ωd which is a pitch rate of rotational movement of the under-spring part 4 in the front-rear direction, which is caused by a difference between the vertical velocity Vdf which is a velocity in the upper-lower direction generated in the front wheel 2 and the vertical velocity Vdr which is a velocity in the upper-lower direction generated in the rear wheel 3.

The correction unit 122 includes a lower reduction unit 144 which reduces the rotational movement of the under-spring part 4 in the front-rear direction caused by a difference between the vertical velocity Vdf and the vertical velocity Vdr. The lower reduction unit 144 sets a lower coefficient Kdf for correcting the reference correction current Icbf and a lower coefficient Kdr for correcting the reference correction current Icbr.

In addition, the correction unit 122 includes an addition unit 145 which calculates synthesis coefficients Kf and Kr by adding the upper coefficients Kuf and Kur set by the upper reduction unit 142 and the lower coefficients Kdf and Kdr set by the lower reduction unit 145.

In addition, the correction unit 122 includes a multiplication unit 146 which calculates the correction currents Icf and Icr by multiplying the reference correction currents Icbf and Icbr set by the reference correction unit 141 and the synthesis coefficients Kf and Kr calculated by the addition unit 145.

(Reference Correction Unit 141)

Figure 7:
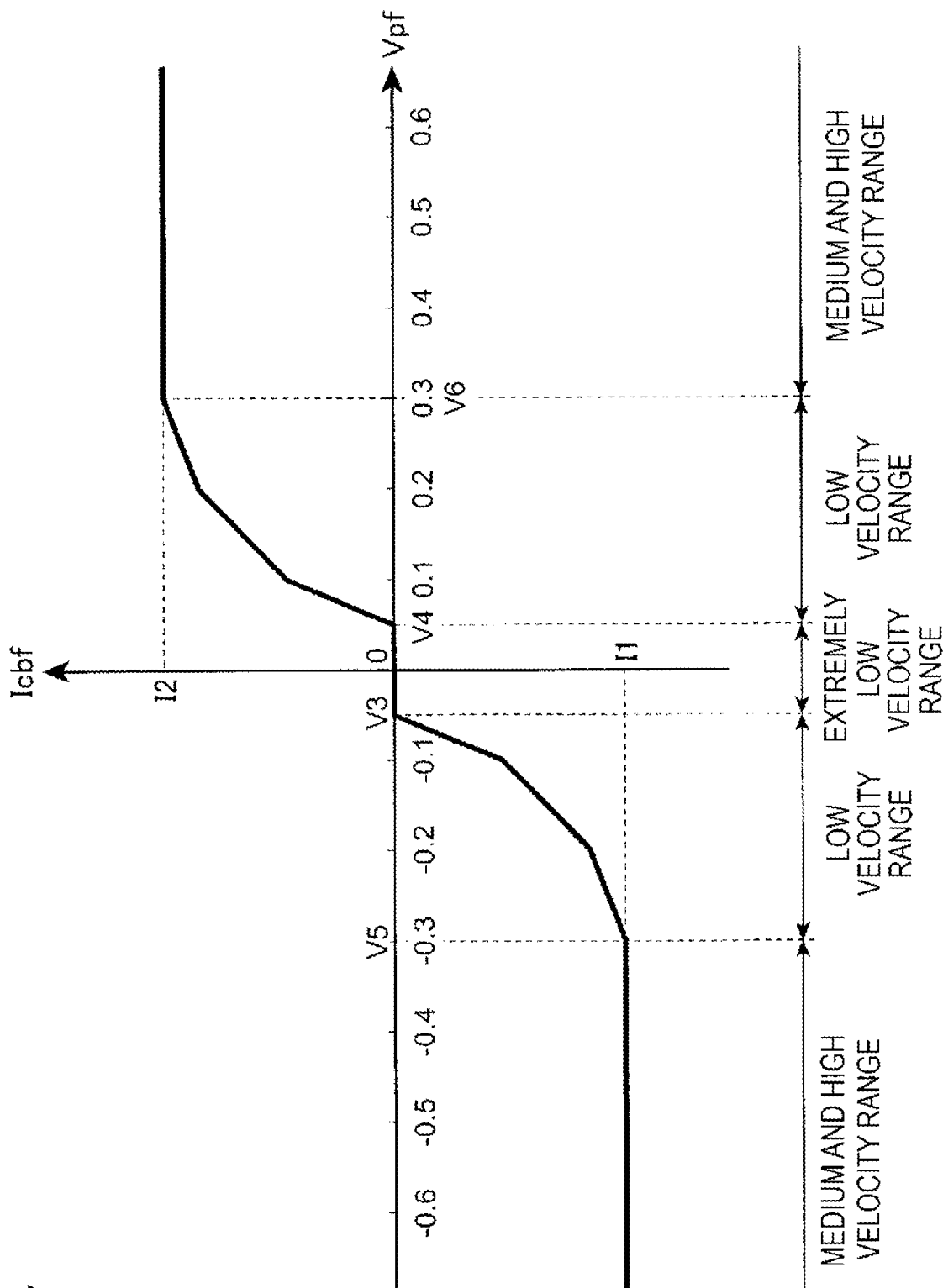
FIG. 7 is a schematic diagram of a control map illustrating an example of a relationship between a reference correction current Icbf and the velocity Vpf.

FIG. 7 is a schematic diagram of a control map illustrating an example of a relationship between the reference correction current Icbf and the velocity Vpf.

The reference correction unit 141 calculates the reference correction current Icbf according to the velocity Vpf. The reference correction unit 141 calculates the reference correction current Icbf by assigning the velocity Vpf into the control map illustrated in FIG. 7 which shows the relationship between the reference correction current Icbf and the velocity Vpf, which is created in advance based on an empirical rule and recorded in the ROM.

In the control map illustrated in FIG. 7, in an extremely low velocity range where an absolute value of the velocity Vpf is extremely small, that is, when the velocity Vpf is equal to or larger than a third predetermined velocity V3 and equal to or smaller than a fourth predetermined velocity V4, the reference correction current Icbf is 0. It can be illustrated as an example that the third predetermined velocity V3 is −0.05 (m/s) and the fourth predetermined velocity V4 is 0.05 (m/s).

In a case where the velocity Vpf is negative, when the velocity Vpf is equal to or smaller than a fifth predetermined velocity V5, the reference correction current Icbf is set to a first steady-state value I1 which is a predetermined negative current amount. In addition, when the velocity Vpf is larger than the fifth predetermined velocity V5 and smaller than the third predetermined velocity V3, the reference correction current Icbf is set to gradually decrease from 0 to the first steady-state value I1 as the velocity Vpf decreases. The fifth predetermined velocity V5 is provided in a medium and high velocity range, and it can be illustrated as an example that the fifth predetermined velocity V5 is −0.3 (m/s). It can be illustrated as an example that when the velocity Vpf is negative, a low velocity range, which is a velocity range between the extremely low velocity range and the medium and high velocity range, is a region larger than −0.3 (m/s) and smaller than −0.05 (m/s).

In the control map illustrated in FIG. 7, in the case where the velocity Vpf is negative, when the absolute value of the velocity Vpf is in the medium and high velocity range which is higher than the low velocity range, the reference correction current Icbf is the first steady-state value I1.

On the other hand, in a case where the velocity Vpf is positive, when the velocity Vpf is equal to or larger than a sixth predetermined velocity V6, the reference correction current Icbf is set to a second steady-state value I2 which is a predetermined positive current amount. In addition, when the velocity Vpf is larger than the fourth predetermined velocity V4 and smaller than the sixth predetermined velocity V6, the reference correction current Icbf is set to gradually increase from 0 to the second steady-state value I2 as the velocity Vpf increases. The sixth predetermined velocity V6 is provided in the medium and high velocity range, and it can be illustrated as an example that the sixth predetermined velocity V6 is 0.3 (m/s). It can be illustrated as an example that when the velocity Vpf is positive, the low velocity range is a region larger than 0.05 (m/s) and smaller than 0.3 (m/s).

In the control map illustrated in FIG. 7, in the case where the velocity Vpf is positive, when the absolute value of the velocity Vpf is in the medium and high velocity range which is higher than the low velocity range, the reference correction current Icbf is the second steady-state value I2. It can be illustrated as an example that when the velocity Vpf is positive, the medium and high velocity range is a region equal to or larger than 0.3 (m/s).

Thus, the reference correction unit 141 sets the reference correction current Icbf to 0 in the extremely low velocity range of the velocity Vpf, and sets the reference correction current Icbf to the first steady-state value I1 or the second steady-state value I2 as an example of a predetermined steady-state value in the medium and high velocity range or higher of the velocity Vpf. Then, in the low velocity range of the velocity Vpf, when the Vpf is negative, the reference correction unit 141 sets the reference correction current Icbf to a value which changes from the first steady-state value I1 to 0 in accordance with an increase in the absolute value of the velocity Vpf, and when the Vpf is positive, the reference correction unit 141 sets the reference correction current Icbf to a value which changes from 0 to the second steady-state value I2 in accordance with an increase in the absolute value of the velocity Vpf.

In the control map illustrated in FIG. 7, the velocity Vpf is divided into a plurality of velocity ranges in a process of changing the reference correction current Icbf from 0 to the first steady-state value I1 or the second steady-state value I2, and the reference correction current Icbf is set so as to linearly change in accordance with the velocity in one velocity range. However, the present invention is not limited to such a mode. In the present invention, it is preferable to use a control map which is set so as to continuously draw a curve with a small curvature from 0 to the first steady-state value I1 or the second steady-state value I2 without dividing into a plurality of velocity ranges.

Since a method of calculating the reference correction current Icbr by the reference correction unit 141 is similar as a method of calculating the reference correction current Icbf, a detailed description thereof is omitted. In addition, since a control map illustrating an example of a relationship between the reference correction current Icbr and the velocity Vpr is similar as the control map illustrating an example of a relationship between the reference correction current Icbf and the velocity Vpf, a detailed description thereof is omitted.

(Upper Reduction Unit 142)

In the following description, a reference sign of the rotational movement of the vehicle body 10 in the front-rear direction is set to be positive in a direction in which the front wheel 2 side sinks and the rear wheel 3 side rises, and to be negative in a direction in which the front wheel 2 side rises and the rear wheel 3 side sinks.

The upper reduction unit 142 sets the upper coefficient Kuf to 0 when the upper rate ωu is 0, sets the upper coefficient Kuf to a predetermined negative value when the upper rate ωu is larger than 0, and sets the upper coefficient Kuf to a predetermined positive value when the upper rate ωu is smaller than 0.

In addition, the upper reduction unit 142 sets the upper coefficient Kur to 0 when the upper rate ωu is 0, sets the upper coefficient Kur to a predetermined positive value when the upper rate ωu is larger than 0, and sets the upper coefficient Kur to a predetermined negative value when the upper rate ωu is smaller than 0.

(Rate Calculation Unit 143)

The rate calculation unit 143 calculates the lower rate ωd using the following equation (1) or the like.

$$\omega d = \tan^{-1}\{(Vdr - Vdf)/(Lr + Lf)\} \quad (1)$$

Here, Lf is a distance in the front-rear direction between a rotation center of the front wheel 2 and the center of gravity G of the vehicle body 10, and Lr is a distance in the front-rear direction between a rotation center of the rear wheel 3 and the center of gravity G of the vehicle body 10.

In addition, the rate calculation unit 143 calculates the vertical velocity Vdf using the velocity Vpf. For example, the rate calculation unit 143 calculates the vertical velocity Vdf by assigning the velocity Vpf calculated by the calculation unit 110 into a control map illustrating a relationship between the vertical velocity Vdf and the velocity Vpf, which is created in advance based on an empirical rule and recorded in the ROM. It can be illustrated as an example that, in the control map illustrating the relationship between the vertical velocity Vdf and the velocity Vpf, the vertical velocity Vdf is 0 when the velocity Vpf is 0, the vertical velocity Vdf is set to be smaller than 0 when the velocity Vpf is larger than 0, and the vertical velocity Vdf is set to be larger than 0 when the velocity Vpf is smaller than 0.

In addition, the rate calculation unit 143 calculates the vertical velocity Vdr using the velocity Vpr. For example, the rate calculation unit 143 calculates the vertical velocity Vdr by assigning the velocity Vpr calculated by the calculation unit 110 into a control map illustrating a relationship between the vertical velocity Vdr and the velocity Vpr, which is created in advance based on an empirical rule and recorded in the ROM. It can be illustrated as an example that, in the control map illustrating the relationship between the vertical velocity Vdr and the velocity Vpr, the vertical velocity Vdr is 0 when the velocity Vpr is 0, the vertical velocity Vdr is set to be smaller than 0 when the velocity Vpr is larger than 0, and the vertical velocity Vdr is set to be larger than 0 when the velocity Vpr is smaller than 0.

(Lower Reduction Unit 144)

The lower reduction unit 144 sets the lower coefficient Kdf to 0 when the lower rate ωd is 0, sets the lower coefficient Kdf to a predetermined negative value when the lower rate ωd is larger than 0, and sets the lower coefficient Kdf to a predetermined positive value when the lower rate ωd is smaller than 0.

In addition, the lower reduction unit 144 sets the lower coefficient Kdr to 0 when the lower rate ωd is 0, sets the lower coefficient Kdr to a predetermined positive value when the lower rate ωd is larger than 0, and sets the lower coefficient Kdr to a predetermined negative value when the lower rate ωd is smaller than 0.

(Addition Unit 145)

The addition unit 145 calculates the synthesis coefficient Kf by adding the upper coefficient Kuf and the lower coefficient Kdf (Kf=Kuf+Kdf). In addition, the addition unit 145 calculates the synthesis coefficient Kr by adding the upper coefficient Kur and the lower coefficient Kdr (Kr=Kur+Kdr).

(Multiplication Unit 146)

The multiplication unit 146 calculates the correction current Icf by multiplying the reference correction current Icbf by the synthesis coefficient Kf (Icf=Icbf×Kf). In addition, the multiplication unit 146 calculates the correction current Icr by multiplying the reference correction current Icbr by the synthesis coefficient Kr (Icr=Icbr×Kr).

(Function and Effects)

As described above, the setting unit 120 sets the target current It and controls the damping force of the damping device 200 to operate as follows.

According to the motorcycle 1, in the extremely low velocity range where the velocity Vp is extremely small, the correction current Ic is set to 0. As a result, it is possible to prevent a steering feeling from being uncomfortable and ride quality from being deteriorated due to control delay or the like in the extremely low velocity range of the velocity Vp. For example, when the suspension starts to contract from an extended state, the damping force should be decreased, it is possible to prevent a case where on the contrary, the damping force is increased. Similarly, when the suspension starts to extend from a contracted state, the damping force should be increased, it is possible to prevent a case where on the contrary, the damping force is decreased. Thus, according to the motorcycle 1, it is possible to prevent the steering feeling from being uncomfortable and the ride quality from being deteriorated by setting the correction current Ic by the correction unit 122 having the upper reduction unit 142 and the lower reduction unit 144.

According to the motorcycle 1, in the process of changing the reference correction current Icb from 0 to the first steady-state value I1 or the second steady-state value I2 in the low velocity range of the velocity Vp, an absolute value of the reference correction current Icb is gradually increased in accordance with an increase the absolute value of the velocity Vp. Accordingly, for example, the damping force tends to gradually change in a process of changing the velocity Vp from the extremely low velocity range to the low velocity range. Therefore, even if the control delay occurs, it is possible to prevent the ride quality from being deteriorated due to sudden change in the damping force. As a result, it is possible to prevent the steering feeling from being uncomfortable and the ride quality from being deteriorated even when the velocity Vp is in the low velocity range.

As described above, according to the motorcycle 1, the ride quality can be improved over a wide velocity range including the extremely low velocity range and the low velocity range.

Second Embodiment

Figure 8:
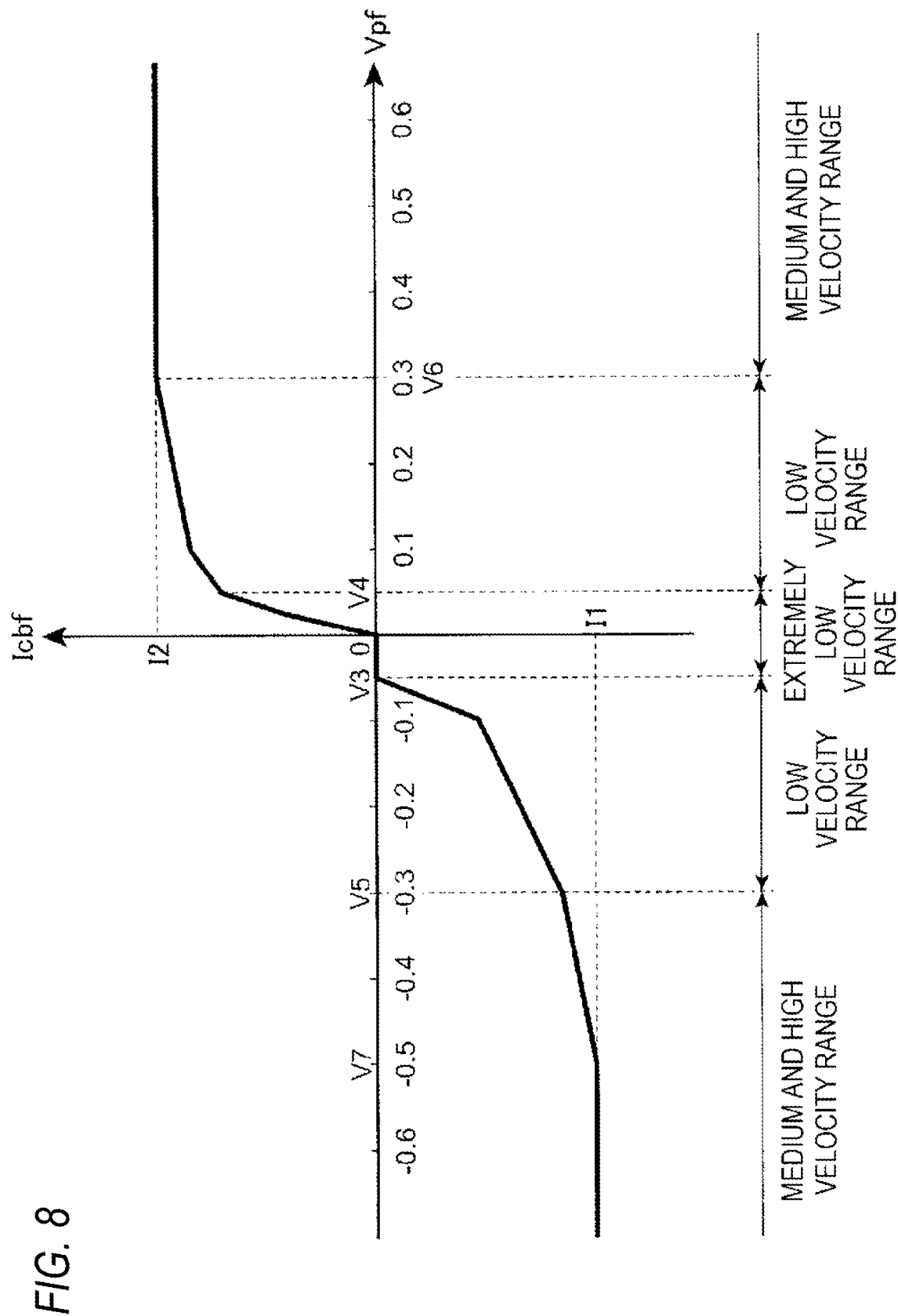
FIG. 8 is a schematic diagram of a control map illustrating an example of a relationship between a reference correction current Icbf and the velocity Vpf used when a reference correction unit according to a second embodiment calculates the reference correction current Icbf.

FIG. 8 is a schematic diagram of a control map illustrating an example of a relationship between the reference correction current Icbf and the velocity Vpf used when a reference correction unit according to the second embodiment calculates the reference correction current Icbf.

A control device of the motorcycle according to the second embodiment differs from the control device 100 according to the first embodiment in the control map illustrating the relationship between the reference correction current Icb and the velocity Vp used when the reference correction unit according to the second embodiment, which corresponds to the reference correction unit 141, calculates the reference correction current Icb. Hereinafter, differences between the control map illustrating an example of the relationship between the reference correction current Icbf and the velocity Vpf illustrated in FIG. 8 used in the second embodiment and the control map according to the first embodiment will be described. Since the control map illustrating an example of a relationship between the reference correction current Icbr and the velocity Vpr is similar as the control map illustrating an example of the relationship between the reference correction current Icbf and the velocity Vpf, a detailed description thereof is omitted.

In the control map illustrated in FIG. 8, when the velocity Vpf is 0, the reference correction current Icbf is 0.

Then, in the case where the velocity Vpf is negative, in the extremely low velocity range where the absolute value of the velocity Vpf is extremely small, that is, when the velocity Vpf is equal to or larger than the third predetermined velocity V3 and smaller than 0, the reference correction current Icbf is 0.

When the velocity Vpf is equal to or smaller than a seventh predetermined velocity V7, the reference correction current Icbf is set to the first steady-state value I1. In addition, when the velocity Vpf is larger than the seventh predetermined velocity V7 and smaller than the third predetermined velocity V3, the reference correction current Icbf is set to gradually decrease from 0 to the first steady-state value I1 as the velocity Vpf decreases. The seventh predetermined velocity V7 is provided in the medium and high velocity range, and it can be illustrated as an example that the seventh predetermined velocity V7 is −0.5 (m/s).

On the other hand, in the case where the velocity Vpf is positive, when the velocity Vpf is equal to or larger than the sixth predetermined velocity V6, the reference correction current Icbf is set to the second steady-state value I2. In addition, when the velocity Vpf is larger than 0 and smaller than the sixth predetermined velocity V6, the reference correction current Icbf is set to gradually increase from 0 to the second steady-state value I2 as the velocity Vpf increases.

Therefore, the reference correction unit according to the second embodiment sets the reference correction current Icbf to 0 when the velocity Vpf is 0, sets the reference correction current Icbf to 0 in the extremely low velocity range when the velocity Vpf is negative, and sets the reference correction current Icbf to the first steady-state value I1 as an example of a predetermined first steady-state value in the medium and high velocity range or higher. Then, the reference correction unit according to the second embodiment sets the reference correction current Icbf to a value which changes from 0 to the first steady-state value I1 in accordance with a decrease in the velocity Vpf in the low velocity range. On the other hand, when the velocity Vpf is positive, the reference correction unit according to the second embodiment sets the reference correction current Icbf to the second steady-state value I2 as an example of a predetermined second steady-state value in the medium and high velocity range or higher, and sets the reference correction current Icbf to a value which changes from 0 to the second steady-state value I2 in accordance with an increase in the velocity Vpf in the extremely low velocity range and the low velocity range.

By setting the reference correction current Icb to 0 in the extremely low velocity range when the velocity Vpf is negative, for example, when the suspension starts to extend from the contracted state, the damping force should be increased, it is possible to prevent a case where on the contrary, the damping force is decreased due to the control delay or the like.

In addition, in a process of increasing the absolute value of the reference correction current Icb to the first steady-state value I1 or the second steady-state value I2 in the low velocity range of the velocity Vpf, the absolute value of the reference correction current Icb is gradually increased in accordance with an increase in the absolute value of the velocity Vpf. Accordingly, for example, the damping force tends to gradually change in the process of changing the velocity Vp from the extremely low velocity range to the low velocity range. Therefore, even if the control delay occurs, it is possible to prevent the ride quality from being deteriorated due to the sudden change in the damping force.

As described above, even when the reference correction unit according to the second embodiment sets the reference correction current Icb using the control map illustrated in FIG. 8, the ride quality can be improved over a wide velocity range including the extremely low velocity range and the low velocity range.

Third Embodiment

Figure 9:
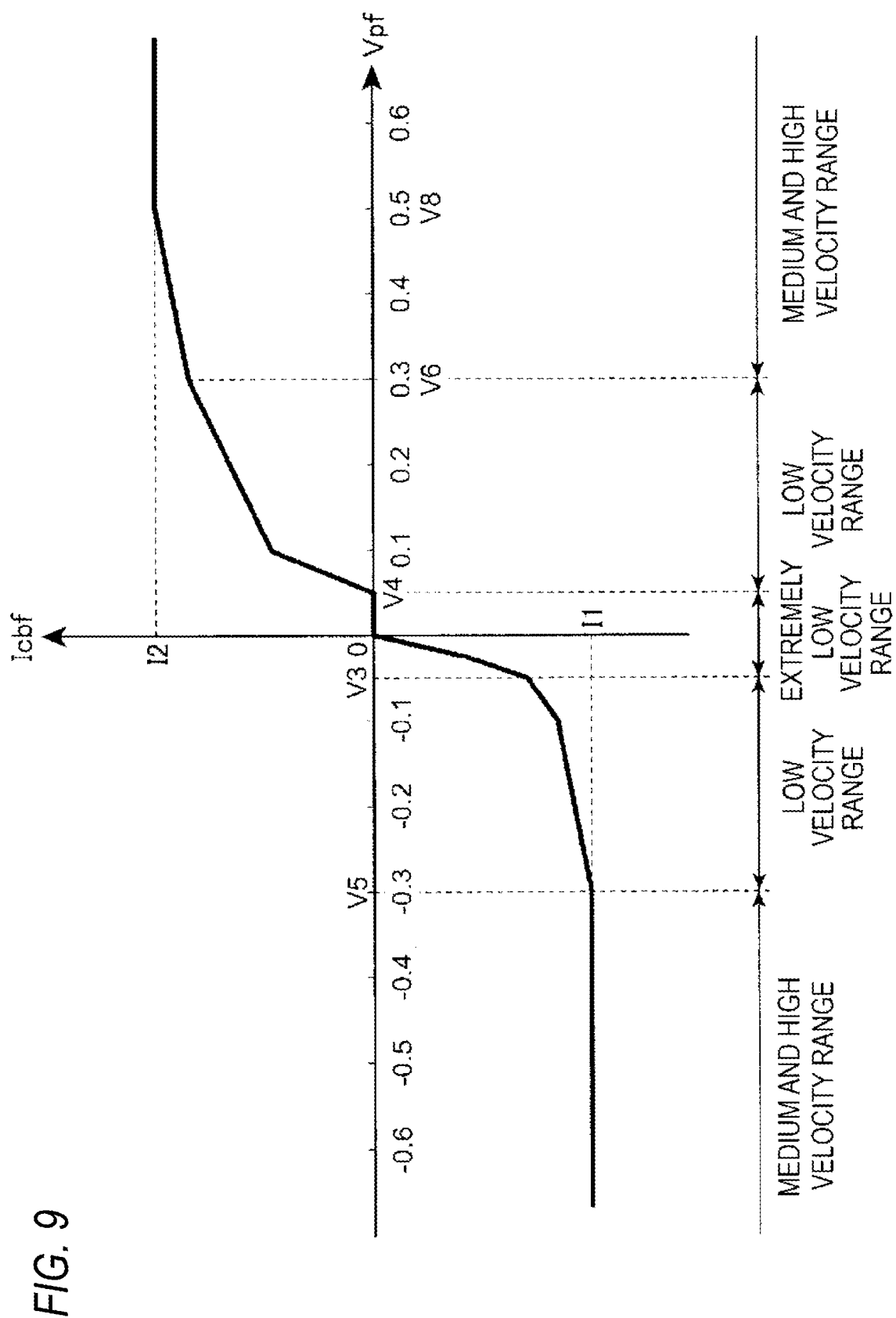
FIG. 9 is a schematic diagram of a control map illustrating an example of a relationship between the reference correction current Icbf and the velocity Vpf used when a reference correction unit according to a third embodiment calculates the reference correction current Icbf.

FIG. 9 is a schematic diagram of a control map illustrating an example of a relationship between the reference correction current Icbf and the velocity Vpf used when a reference correction unit according to the third embodiment calculates the reference correction current Icbf.

A control device of the motorcycle according to the third embodiment differs from the control device 100 according to the first embodiment in the control map illustrating an example of the relationship between the reference correction current Icb and the velocity Vp used when the reference correction unit according to the third embodiment, which corresponds to the reference correction unit 141, calculates the reference correction current Icb. Hereinafter, differences between the control map illustrating an example of the relationship between the reference correction current Icbf and the velocity Vpf illustrated in FIG. 9 used in the third embodiment and the control map according to the first embodiment will be described. Since the control map illustrating an example of a relationship between the reference correction current Icbr and the velocity Vpr is similar as the control map illustrating an example of the relationship between the reference correction current Icbf and the velocity Vpf, a detailed description thereof is omitted.

In the control map illustrated in FIG. 9, when the velocity Vpf is 0, the reference correction current Icbf is 0.

Then, in the case where the velocity Vpf is negative, when the velocity Vpf is equal to or smaller than the fifth predetermined velocity V5, the reference correction current Icbf is set to the first steady-state value I1. In addition, when the velocity Vpf is smaller than 0 and larger than the fifth predetermined velocity V5, the current amount is set to gradually decrease from 0 to the first steady-state value I1 as the velocity Vpf decreases.

On the other hand, in the case where the velocity Vpf is positive, in the extremely low velocity range where the absolute value of the velocity Vpf is extremely small, that is, when the velocity Vpf is equal to or larger than 0 and equal to or smaller than the fourth predetermined velocity V4, the reference correction current Icbf is 0.

When the velocity Vpf is equal to or larger than an eighth predetermined velocity V8, the reference correction current Icbf is set to the second steady-state value I2. In addition, when the velocity Vpf is larger than the fourth predetermined velocity V4 and smaller than the eighth predetermined velocity V8, the current amount is set to gradually increase from 0 to the second steady-state value I2 as the velocity Vpf increases. The eighth predetermined velocity V8 is provided in the medium and high velocity range, and it can be illustrated as an example that the eighth predetermined velocity V8 is 0.5 (m/s).

Therefore, the reference correction unit according to the third embodiment sets the reference correction current Icbf to 0 when the velocity Vpf is 0, sets the reference correction current Icbf to the first steady-state value I1 as an example of the predetermined first steady-state value in the medium and high velocity range or higher when the velocity Vp is negative, and sets the reference correction current Icbf to a value which changes from 0 to the first steady-state value I1 in accordance with a decrease in the velocity Vp in the extremely low velocity range and the low velocity range. On the other hand, the reference correction unit according to the third embodiment sets, when the velocity Vp is positive, the reference correction current Icbf to 0 in the extremely low velocity range, and sets the reference correction current Icbf to the second steady-state value I2 as an example of the predetermined second steady-state value in the medium and high velocity range or higher. Then, the reference correction unit according to the third embodiment sets the reference correction current Icbf to a value which changes from 0 to the second steady-state value I2 in accordance with an increase of the velocity Vp in the low velocity range.

By setting the reference correction current Icb to 0 in the extremely low velocity range when the velocity Vpf is positive, for example, when the suspension starts to contract from the extended state, the damping force should be decreased, it is possible to prevent a case where on the contrary, the damping force is increased due to the control delay or the like.

In addition, in the process of increasing the absolute value of the reference correction current Icb to the first steady-state value I1 or the second steady-state value I2 in the low velocity range of the velocity Vp, the absolute value of the reference correction current Icb is gradually increased in accordance with an increase in the absolute value of the velocity Vp. Accordingly, for example, the damping force tends to gradually change in the process of changing the velocity Vp from the extremely low velocity range to the low velocity range. Therefore, even if the control delay occurs, it is possible to prevent the ride quality from being deteriorated due to the sudden change in the damping force.

As described above, even when the reference correction unit according to the third embodiment sets the reference correction current Icb using the control map illustrated in FIG. 9, the ride quality can be improved over a wide velocity range including the extremely low velocity range and the low velocity range.

Fourth Embodiment

Figure 10:
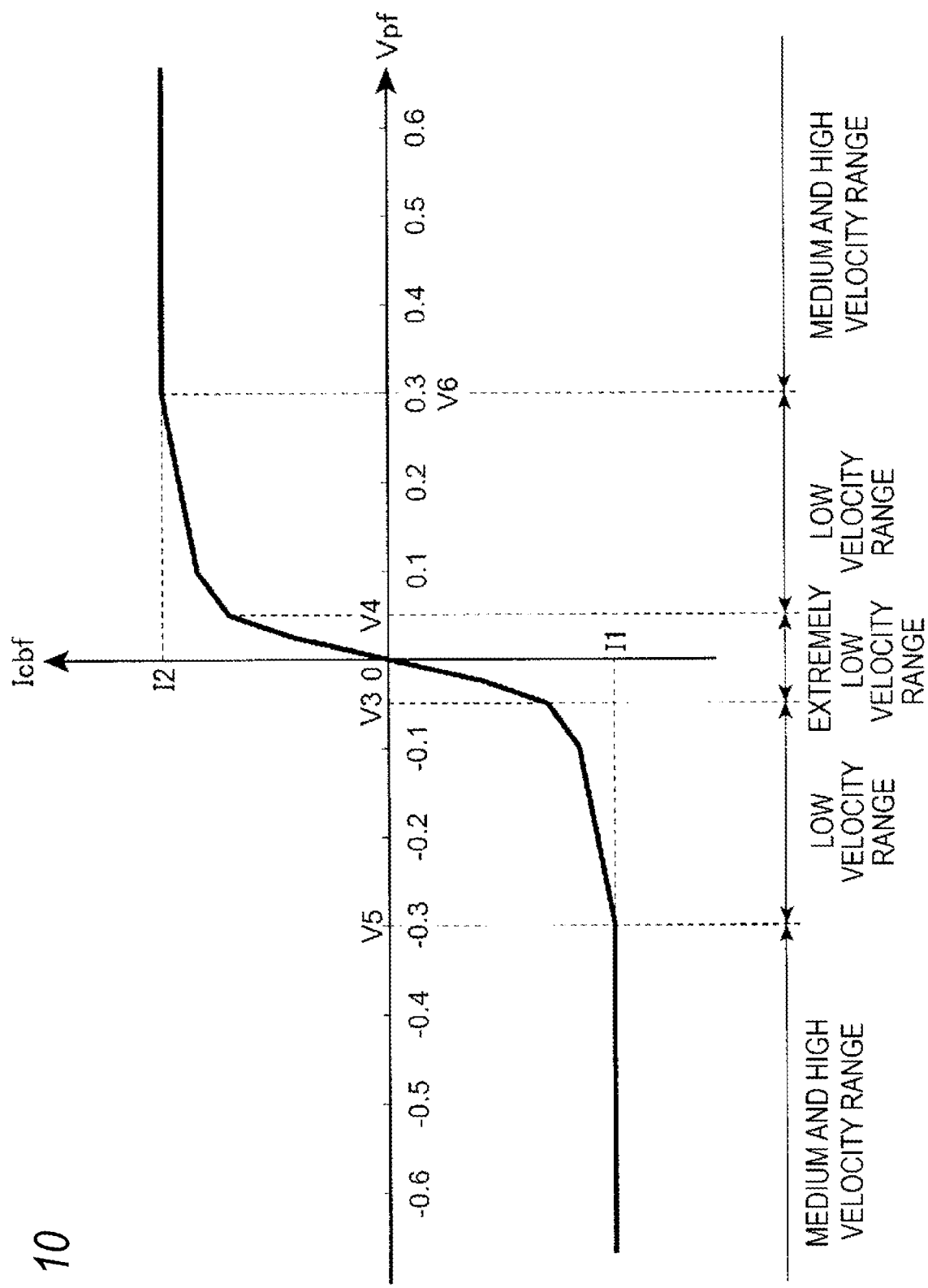
FIG. 10 is a schematic diagram of a control map illustrating an example of a relationship between the reference correction current Icbf and the velocity Vpf used when a reference correction unit according to a fourth embodiment calculates the reference correction current Icbf.

FIG. 10 is a schematic diagram of a control map illustrating an example of a relationship between the reference correction current Icbf and the velocity Vpf used when a reference correction unit according to the fourth embodiment calculates the reference correction current Icbf.

A control device of the motorcycle according to the fourth embodiment differs from the control device 100 according to the first embodiment in the control map illustrating an example of the relationship between the reference correction current Icb and the velocity Vp used when the reference correction unit according to the fourth embodiment, which corresponds to the reference correction unit 141, calculates the reference correction current Icb. Hereinafter, differences between the control map illustrating an example of the relationship between the reference correction current Icbf and the velocity Vpf illustrated in FIG. 10 used in the fourth embodiment and the control map according to the first embodiment will be described. Since the control map illustrating an example of a relationship between the reference correction current Icbr and the velocity Vpr is similar as the control map illustrating an example of the relationship between the reference correction current Icbf and the velocity Vpf, a detailed description thereof is omitted.

In the control map illustrated in FIG. 10, when the velocity Vpf is 0, the reference correction current Icbf is 0. Then, when the velocity Vpf is negative, the relationship between the reference correction current Icbf and the velocity Vpf is similar as a case where the velocity Vpf is negative in the control map illustrated in FIG. 9, and when the velocity Vpf is positive, the relationship between the reference correction current Icbf and the velocity Vpf is similar as a case where the velocity Vpf is positive in the control map illustrated in FIG. 8.

That is, the reference correction unit according to the fourth embodiment sets the reference correction current Icbf to 0 when the velocity Vpf is 0, and sets the reference correction current Icbf to the first steady-state value I1 or the second steady-state value I2 when the velocity Vpf is in the medium and high velocity range or higher. In addition, the reference correction unit according to the fourth embodiment sets the reference correction current Icbf to a value which changes from 0 to the first steady-state value I1 or the second steady-state value I2 in accordance with an increase in the absolute value of the velocity Vpf in the extremely low velocity range and the low velocity range of the velocity Vpf.

By setting the reference correction current Icbf using the control map illustrated in FIG. 10, in the extremely low velocity range when the velocity Vpf is negative, when the suspension starts to extend from the contracted state, the damping force should be increased, and it is possible to prevent a case where the damping force becomes too small. In the extremely low velocity range when the velocity Vpf is positive, when the suspension starts to contract from the extended state, the damping force should be decreased, and it is possible to prevent a case where the damping force becomes too large.

In addition, in the process of increasing the absolute value of the reference correction current Icb to the first steady-state value I1 or the second steady-state value I2 in the low velocity range of the velocity Vp, the absolute value of the reference correction current Icb is gradually increased in accordance with an increase in the absolute value of the velocity Vp. Accordingly, for example, the damping force tends to gradually change in the process of changing the velocity Vp from the extremely low velocity range to the low velocity range. Therefore, even if the control delay occurs, it is possible to prevent the ride quality from being deteriorated due to the sudden change in the damping force.

As described above, even when the reference correction unit according to the fourth embodiment sets the reference correction current Icb using the control map illustrated in FIG. 10, the ride quality can be improved over a wide velocity range including the extremely low velocity range and the low velocity range.

Fifth Embodiment

Figure 11:
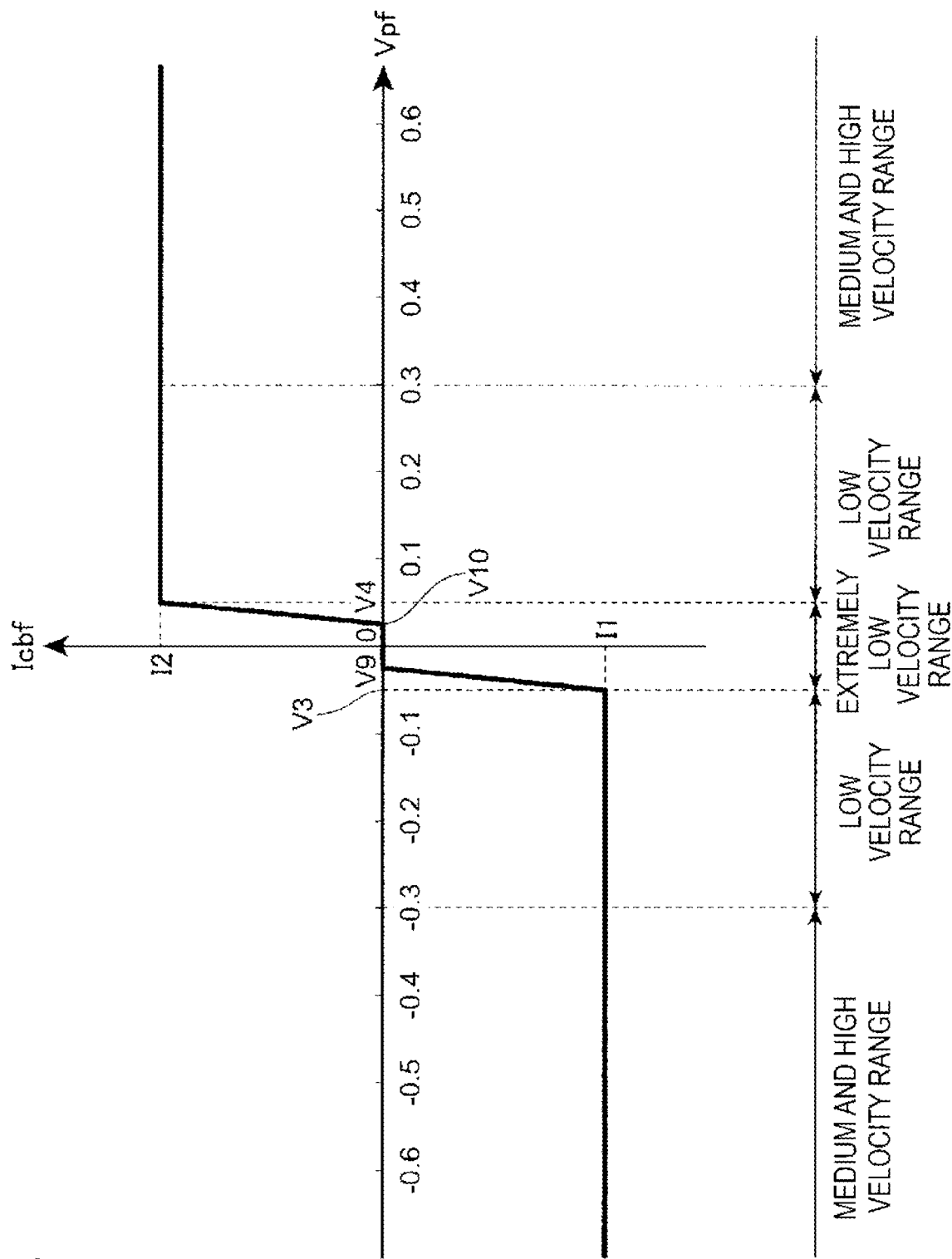
FIG. 11 is a schematic diagram of a control map illustrating an example of a relationship between the reference correction current Icbf and the velocity Vpf used when a reference correction unit according to a fifth embodiment calculates the reference correction current Icbf.

FIG. 11 is a schematic diagram of a control map illustrating an example of a relationship between the reference correction current Icbf and the velocity Vpf used when a reference correction unit according to the fifth embodiment calculates the reference correction current Icbf.

A control device of the motorcycle according to the fifth embodiment differs from the control device 100 according to the first embodiment in the control map illustrating an example of the relationship between the reference correction current Icb and the velocity Vp used when the reference correction unit according to the fifth embodiment, which corresponds to the reference correction unit 141, calculates the reference correction current Icb. Hereinafter, differences between the control map illustrating an example of the relationship between the reference correction current Icbf and the velocity Vpf illustrated in FIG. 11 used in the fifth embodiment and the control map according to the first embodiment will be described. Since the control map illustrating an example of a relationship between the reference correction current Icbr and the velocity Vpr is similar as the control map illustrating an example of the relationship between the reference correction current Icbf and the velocity Vpf, a detailed description thereof is omitted.

In the control map illustrated in FIG. 11, when the velocity Vpf is equal to or larger than a ninth predetermined velocity V9 and equal to or smaller than a tenth predetermined velocity V10, the reference correction current Icbf is 0. It can be illustrated as an example that the ninth predetermined velocity V9 is −0.025 (m/s) and the tenth predetermined velocity V10 is 0.025 (m/s).

In addition, in the case where the velocity Vpf is negative, when the velocity Vpf is equal to or smaller than the third predetermined velocity V3, the reference correction current Icbf is set to the first steady-state value I1. Then, in a velocity range lower than the ninth predetermined velocity V9 and higher than the third predetermined velocity V3, the reference correction current Icbf is set to change from 0 to the first steady-state value I1 in one step.

In addition, in the case where the velocity Vpf is positive, when the velocity Vpf is equal to or larger than the fourth predetermined velocity V4, the reference correction current Icbf is set to the second steady-state value I2. Then, in a velocity range higher than the tenth predetermined velocity V10 and lower than the fourth predetermined velocity V4, the reference correction current Icbf is set to change from 0 to the second steady-state value I2 in one step.

By setting the reference correction current Icbf using the control map illustrated in FIG. 11, the correction current Ic is set to 0 in the extremely low velocity range where the velocity Vpf is equal to or larger than the ninth predetermined velocity V9 and equal to or smaller than the tenth predetermined velocity V10 where the velocity Vpf is extremely small. As a result, it is possible to prevent the steering feeling from being uncomfortable and the ride quality from being deteriorated due to the control delay or the like.

In addition, in a velocity range lower than the ninth predetermined velocity V9 and higher than the third predetermined velocity V3, the reference correction current Icbf is set to change from 0 to the first steady-state value I1. Accordingly, for example, in a velocity range lower than a velocity range between the ninth predetermined velocity V9 and the third predetermined velocity V3, for example, a velocity range lower than −0.025 (m/s) and higher than −0.03 (m/s), as compared with a case where the reference correction current Icbf changes from 0 to the first steady-state value I1, the damping force tends to gradually change. Therefore, even if the control delay occurs, it is possible to prevent the ride quality from being deteriorated due to the sudden change in the damping force.

Similarly, in a velocity range higher than the tenth predetermined velocity V10 and lower than the fourth predetermined velocity V4, the reference correction current Icbf is set to change from 0 to the second steady-state value I2. Accordingly, for example, in a velocity range lower than a velocity range between the tenth predetermined velocity V10 and the fourth predetermined velocity V4, for example, a velocity range higher than 0.025 (m/s) and lower than 0.03 (m/s), as compared with a case where the reference correction current Icb changes from 0 to the second steady-state value I2, the damping force tends to gradually change. Therefore, even if the control delay occurs, it is possible to prevent the ride quality from being deteriorated due to the sudden change in the damping force.

Therefore, even when the reference correction unit according to the fifth embodiment sets the reference correction current Icb using the control map illustrated in FIG. 11, the ride quality can be improved over a wide velocity range including the extremely low velocity range, and steering stability can be secured.

Sixth Embodiment

Figure 12:
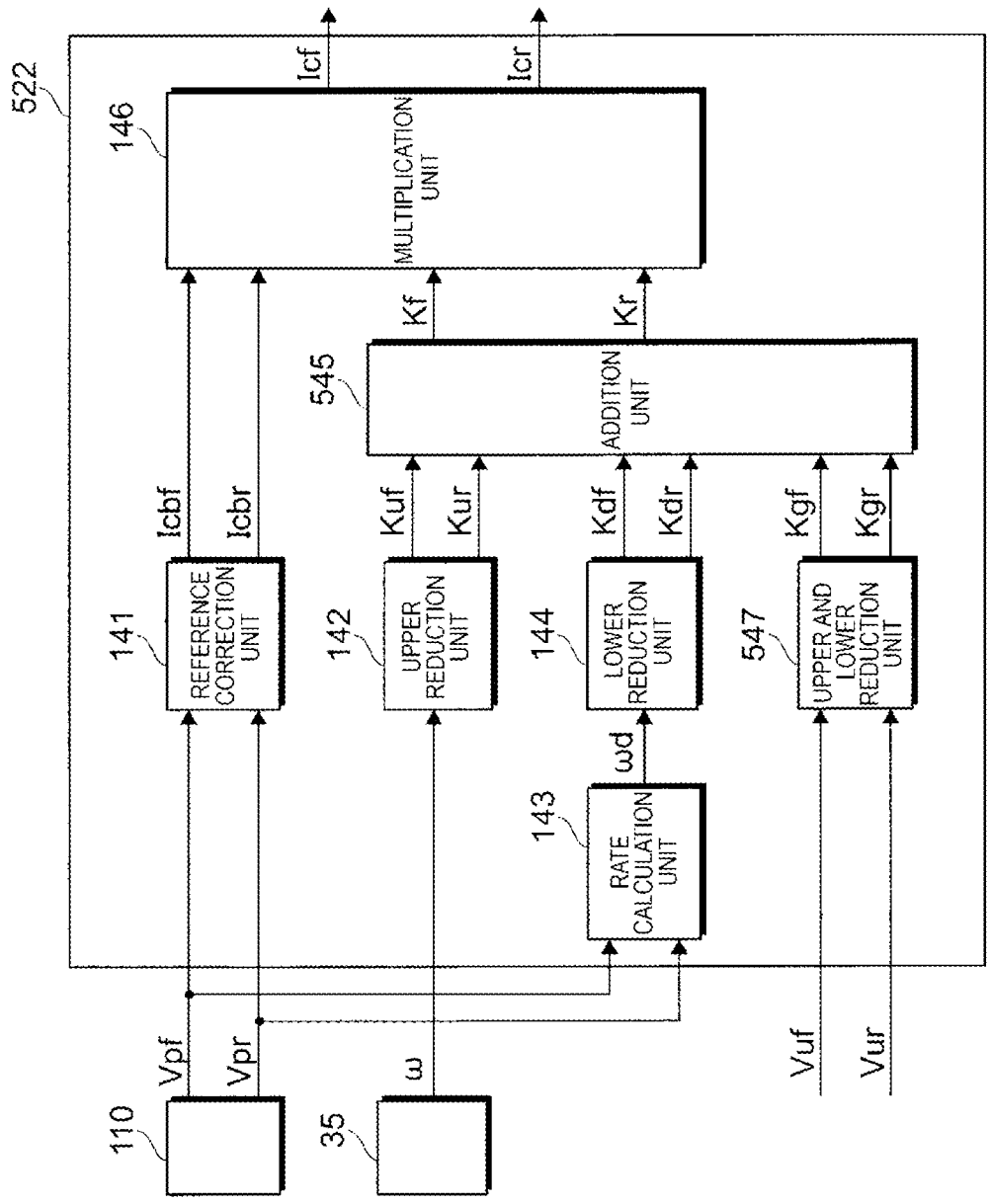
FIG. 12 is a diagram illustrating an example of a schematic configuration of a correction unit 522 of a motorcycle 500 according to a sixth embodiment.

FIG. 12 is a diagram illustrating an example of a schematic configuration of a correction unit 522 of a motorcycle 500 according to the sixth embodiment.

The motorcycle 500 according to the sixth embodiment differs from the motorcycle 1 according to the first embodiment in the correction unit 522 corresponding to the correction unit 122. The correction unit 522 differs from the correction unit 122 in that the correction unit 522 includes an upper and lower reduction unit 547 which reduces vibration in the upper-lower direction of the vehicle body 10, and a method is adopted in which an addition unit 545 corresponding to the addition unit 145 calculates the synthesis coefficients Kf and Kr. Hereinafter, differences from the motorcycle 1 will be described. Objects having the same function are denoted by the same reference signs in the motorcycle 1 and the motorcycle 500, and a detailed description thereof is omitted.

The upper and lower reduction unit 547 sets upper-lower coefficients Kgf and Kgr for correcting the reference correction currents Icbf and Icbr in order to prevent vibration in the upper-lower direction of the vehicle body 10 based on a known skyhook theory. A method of setting the upper-lower coefficient Kgf will be described below. Since a method of setting the upper-lower coefficient Kgr is the same as the method of setting the upper-lower coefficient Kgf, a description thereof is omitted.

When the vertical velocity Vuf, and a relative velocity (Vuf–Vdf) between the vertical velocity Vuf and the vertical velocity Vdf are in the same direction, the upper and lower reduction unit 547 sets the upper-lower coefficient Kgf to a positive value. On the other hand, when the vertical velocity Vuf, and the relative velocity (Vuf–Vdf) between the vertical velocity Vuf and the vertical velocity Vdf are in opposite directions, the upper and lower reduction unit 547 sets the upper-lower coefficient Kgf to a negative value.

It can be illustrated as an example that the vertical velocities Vuf and Vur are obtained by integrating acceleration in the upper-lower direction, which is detected by an acceleration sensor provided in the motorcycle 500. The vertical velocities Vdf and Vdr may be calculated by using the upper rate ωu detected by the pitch rate sensor 35, a distance in the front-rear direction between the pitch rate sensor 35 and the rotation center of front wheel 2, and a distance in the front-rear direction between the pitch rate sensor 35 and the rotation center of the rear wheel 3.

The addition unit 545 calculates the synthesis coefficient Kf by adding the upper-lower coefficient Kgf, the upper coefficient Kuf, and the lower coefficient Kdf (Kf=Kgf+Kuf+Kdf). In addition, the addition unit 545 calculates the synthesis coefficient Kr by adding the upper-lower coefficient Kgr, the upper coefficient Kur, and the lower coefficient Kdr (Kr=Kgr+Kur+Kdr).

According to the motorcycle 500 of the sixth embodiment, in addition to an operation of the motorcycle 1 according to the first embodiment, it is possible to prevent vibration in the upper-lower direction occurring, for example, when the motorcycle 500 travels on a road surface having unevenness.

The reference correction unit 141 of the correction unit 522 of the motorcycle 500 according to the sixth embodiment may set the reference correction current Icb using the control map according to the second embodiment illustrated in FIG. 8, the control map according to the third embodiment illustrated in FIG. 9, the control map according to the fourth embodiment illustrated in FIG. 10, or the control map according to the fifth embodiment illustrated in FIG. 11.

The correction unit 522 of the motorcycle 500 according to the sixth embodiment may not include the upper reduction unit 142. Even if the upper reduction unit 142 is not included, an effect is achieved with the lower reduction unit 144 and the upper and lower reduction unit 547 included.

Similarly, the correction unit 122 of the motorcycle 1 according to the first embodiment may not include the upper reduction unit 142. Even if the upper reduction unit 142 is not included, an effect is achieved with the lower reduction unit 144 included.

In the above description related to the present invention, a mode is illustrated in which the control maps illustrated in FIGS. 7 to 11 are used in the saddle-type vehicle in which the control is performed using the coefficient set by using the angular velocity of the rotational movement of the underspring part in the front-rear direction, but the present invention is not limited to the mode. The present invention can also be applied to a saddle-type vehicle in which control is performed without using the coefficient set by using the angular velocity of the rotational movement of the underspring part in the front-rear direction. As such a saddle-type vehicle, for example, a saddle-type vehicle in which the damping force is controlled by skyhook control using the upper rate ωu and skyhook control using a vertical acceleration of an above-spring part can be illustrated as an example. Depending on a mode of use of the saddle-type vehicle, an effect of the present invention may be more likely to be achieved in a saddle-type vehicle in which the control is performed without using the coefficient set by using the angular velocity of the rotational movement of the under-spring part in the front-rear direction than a saddle-type vehicle in which control using the coefficient is performed.

The invention claimed is:

1. A control device comprising:
an arithmetic and logical operation circuit configured to set a target current supplied to a damping force control valve included in a suspension disposed between a vehicle body of a straddle-type vehicle and at least one of a front wheel disposed on a front side of the vehicle body and a rear wheel disposed on a rear side of the vehicle body, wherein
the target current is set by adding a reference current and a correction current,
the reference current is set according to a change velocity of a stroke amount of the suspension,
the correction current is calculated from a reference correction current that is determined by the change velocity of the stroke amount of the suspension,
the reference correction current is set to: 0 when the change velocity of the stroke amount of the suspension is 0, 0 in a first velocity range which is a velocity range in which the change velocity is equal to or larger than a first threshold and smaller than 0, or 0 in a second velocity range which is a velocity range in which the change velocity is larger than 0 and equal to or smaller than a second threshold,
when the reference correction current is set to 0 in the first velocity range, (i) the reference correction current is set to a predetermined first value in a third velocity range which is a velocity range where the change velocity is smaller than a third threshold which is smaller than the first threshold, (ii) the reference correction current is set to a value which changes from 0 to the predetermined first value in accordance with a decrease in the change velocity in a fourth velocity range which is a velocity range in which the change velocity is equal to or larger than the third threshold and smaller than the first threshold, (iii) the reference correction current is set to a predetermined second value in a fifth velocity range which is a velocity range in which the change velocity is larger than a fourth threshold which is larger than the second threshold, and (iv) the reference correction current is set to a value which changes from 0 to the predetermined second value in accordance with an increase in the change velocity in a sixth velocity range which is a velocity range in which the change velocity is larger than the second threshold and equal to or smaller than the fourth threshold,
when the reference correction current is set to 0 in the second velocity range, (i) the reference correction current is set to the predetermined first value in the third velocity range, (ii) the reference correction current is set to a value which changes from 0 to the predetermined first value in accordance with the decrease in the change velocity in the first velocity range and the fourth velocity range, (iii) the reference correction current is set to the predetermined second value in the fifth velocity range, and (iv) the reference correction current is set to a value which changes from 0 to the predetermined second value in accordance with the increase in the change velocity in the sixth velocity range, and
the arithmetic and logical operation circuit is configured to drive the damping force control valve included in the suspension according to the target current such that deterioration in ride quality of the vehicle can be prevented.

2. A suspension system comprising:
the control device according to claim 1; and
a suspension whose damping force is controlled by the control device.

3. A saddle-type vehicle comprising:
a vehicle body;
a front wheel disposed on a front side of the vehicle body and a rear wheel disposed on a rear side of the vehicle body; and
the suspension system according to claim 2.

* * * * *